United States Patent
Shellhammer et al.

(10) Patent No.: US 8,750,281 B2
(45) Date of Patent: Jun. 10, 2014

(54) VARIABLE-LENGTH TRAINING FIELDS IN COAXIAL COMMUNICATIONS

(75) Inventors: Stephen J. Shellhammer, Ramona, CA (US); Juan Montojo, Nuremberg (DE)

(73) Assignee: QUALCOMM Incorporated, San Diego, CA (US)

( * ) Notice: Subject to any disclaimer, the term of this patent is extended or adjusted under 35 U.S.C. 154(b) by 155 days.

(21) Appl. No.: 13/529,725

(22) Filed: Jun. 21, 2012

(65) Prior Publication Data

US 2013/0343754 A1    Dec. 26, 2013

(51) Int. Cl.
*H04J 3/24* (2006.01)
*H04W 80/04* (2009.01)
*H04L 5/00* (2006.01)

(52) U.S. Cl.
CPC ............. *H04W 80/04* (2013.01); *H04L 5/0007* (2013.01)
USPC .......................................... 370/349; 370/208

(58) Field of Classification Search
CPC .............................. H04L 5/0007; H04W 80/04
USPC .......................................... 370/203, 208, 349
See application file for complete search history.

(56) References Cited

U.S. PATENT DOCUMENTS

| | | | |
|---|---|---|---|
| 7,039,131 B2 | 5/2006 | Banerjea | |
| 7,269,430 B2 * | 9/2007 | Moorti et al. | 455/458 |
| 7,466,768 B2 | 12/2008 | Su et al. | |
| 7,903,755 B2 * | 3/2011 | Mujtaba | 375/295 |
| 8,175,119 B2 * | 5/2012 | Zhang et al. | 370/474 |
| 8,331,419 B2 * | 12/2012 | Zhang et al. | 375/141 |
| 8,553,730 B2 * | 10/2013 | Schmidl et al. | 370/512 |
| 8,619,907 B2 * | 12/2013 | Mujtaba et al. | 375/299 |
| 2007/0053454 A1 | 3/2007 | Bhardwaj et al. | |
| 2010/0329683 A1 | 12/2010 | Liu | |
| 2011/0051705 A1 * | 3/2011 | Jones et al. | 370/338 |
| 2011/0096855 A1 | 4/2011 | Youn et al. | |
| 2011/0188482 A1 * | 8/2011 | Vermani et al. | 370/338 |
| 2011/0194636 A1 | 8/2011 | Monk et al. | |

FOREIGN PATENT DOCUMENTS

WO    2013058068 A1    4/2013

OTHER PUBLICATIONS

Bill Powell: "EPoC System Level Synchronization Transport 802.3bn Interim Meeting—Phoenix; Powell_01_0113", IEEE Draft; Powell_01_0113, IEEE-SA, Piscataway, NJ USA, vol. 802.3bn, Jan. 17, 2013, pp. 1-20, XP068049164.
Changes to IEEE 802.16ab-01/01, Sections 8.3.6.3.3.5 and 8.3.6.4.2.2; 80216abc-01_05, IEEE Draft; 80216ABC-01_05, IEEE-SA, Piscataway, NJ USA, vol. 802.16, Jul. 3, 2001, pp. 1-5, XP017620936.
International Search Report and Written Opinion—PCT/US2013/046025—ISA/EPO—Jun. 8, 2013.

(Continued)

*Primary Examiner* — Brenda H Pham
(74) *Attorney, Agent, or Firm* — Mahamedi Paradice Kreisman LLP

(57) ABSTRACT

A coaxial physical layer device operates in at least two different modes: a discovery mode and a normal mode. In the discovery mode, a first orthogonal frequency-division multiplexing (OFDM) coaxial signal is received that has a preamble including a plurality of first training fields and at least one second training field. Each first training field is shorter than each second training field. In the normal mode, a second OFDM coaxial signal is received that has a preamble including a single training field. The single training field is shorter than an OFDM symbol.

24 Claims, 5 Drawing Sheets

(56) References Cited

OTHER PUBLICATIONS

IEEE Std 802.11a-1999 (Supplement to IEEE Std 802.11-1999) Supplement to IEEE Standard for Information Technology—Telecommunications and information exchange between systems—Local and metropolitan area networks—Specific requirements—Part 11: Wireless LAN Medium Access Control (MAC) and Physical Layer (PHY) specifications: High-speed Physical Layer in the 5 GHZ Band, pp. 1-91.

* cited by examiner

VARIABLE-LENGTH TRAINING FIELDS IN COAXIAL COMMUNICATIONS

TECHNICAL FIELD

The present embodiments relate generally to communication systems, and specifically to OFDM communications over coaxial cable plants.

BACKGROUND OF RELATED ART

A network may use both optical fiber and coaxial cable ("coax") for respective links. For example, the portions of the network that use optical fiber may be implemented using the Ethernet Passive Optical Networks (EPON) protocol, and the EPON protocol may be extended over coaxial cable plants. EPON over coax is called EPOC. The coax physical layer (PHY) used for EPOC communications may be an orthogonal frequency-division multiplexing (OFDM) PHY. Examples of the number of tones that may be used by coax OFDM PHYs include 4096, 8192, or 16384 (e.g., as provided by correspondingly sized FFTs).

Coax signals (e.g., EPOC signals) may be impaired by carrier frequency offset (CFO), which results from a difference between the frequency of a local oscillator in a transmitter and the frequency of a corresponding local oscillator in a receiver. (Other sources of signal impairment include I/Q mismatch and channel distortion.) To reduce costs, it is desirable to use relatively low-accuracy oscillators (e.g., crystal oscillators) in the transmitter and receiver. For example, the oscillators may have an accuracy of 20 parts per million (ppm). The combination of low-accuracy oscillators, the potentially high carrier frequencies anticipated for EPOC communications (e.g., 1 GHz or more), the potentially large bandwidths anticipated for EPOC communications (e.g., up to 100 MHz or more), and the large number of tones anticipated for EPOC communications (e.g., 4K, 8K, or 16K tones) presents a significant challenge with regard to carrier frequency offset. For example, a 20 ppm oscillator with a 1 GHz carrier frequency has a potential frequency error of 20 kHz, resulting in a worst-case frequency offset of 40 kHz between the transmitter and receiver. Assuming a bandwidth of 150 MHz and a coax PHY with 4096 tones (e.g., as provided by a 4096 FFT), the tone spacing is approximately 37 kHz. In this example, the worst-case frequency offset is higher than the tone spacing, which would impair communications. Even if higher accuracy oscillators are used, narrow tone spacing can still exacerbate the effects of carrier frequency offset.

A receiver can correct for frequency offsets by using training fields included in packet preambles. However, training fields consume bandwidth. Given the large number of tones available for coax OFDM PHYs, the data for an entire packet may fit in a few OFDM symbols or even a single OFDM symbol. Therefore, it is not practical to dedicate one or more OFDM symbols as training fields during data communications. Accordingly, there is a need for methods and systems that make efficient use of training fields.

BRIEF DESCRIPTION OF THE DRAWINGS

The present embodiments are illustrated by way of example and are not intended to be limited by the figures of the accompanying drawings.

Like reference numerals refer to corresponding parts throughout the drawings and specification.

DETAILED DESCRIPTION

Figure 1:
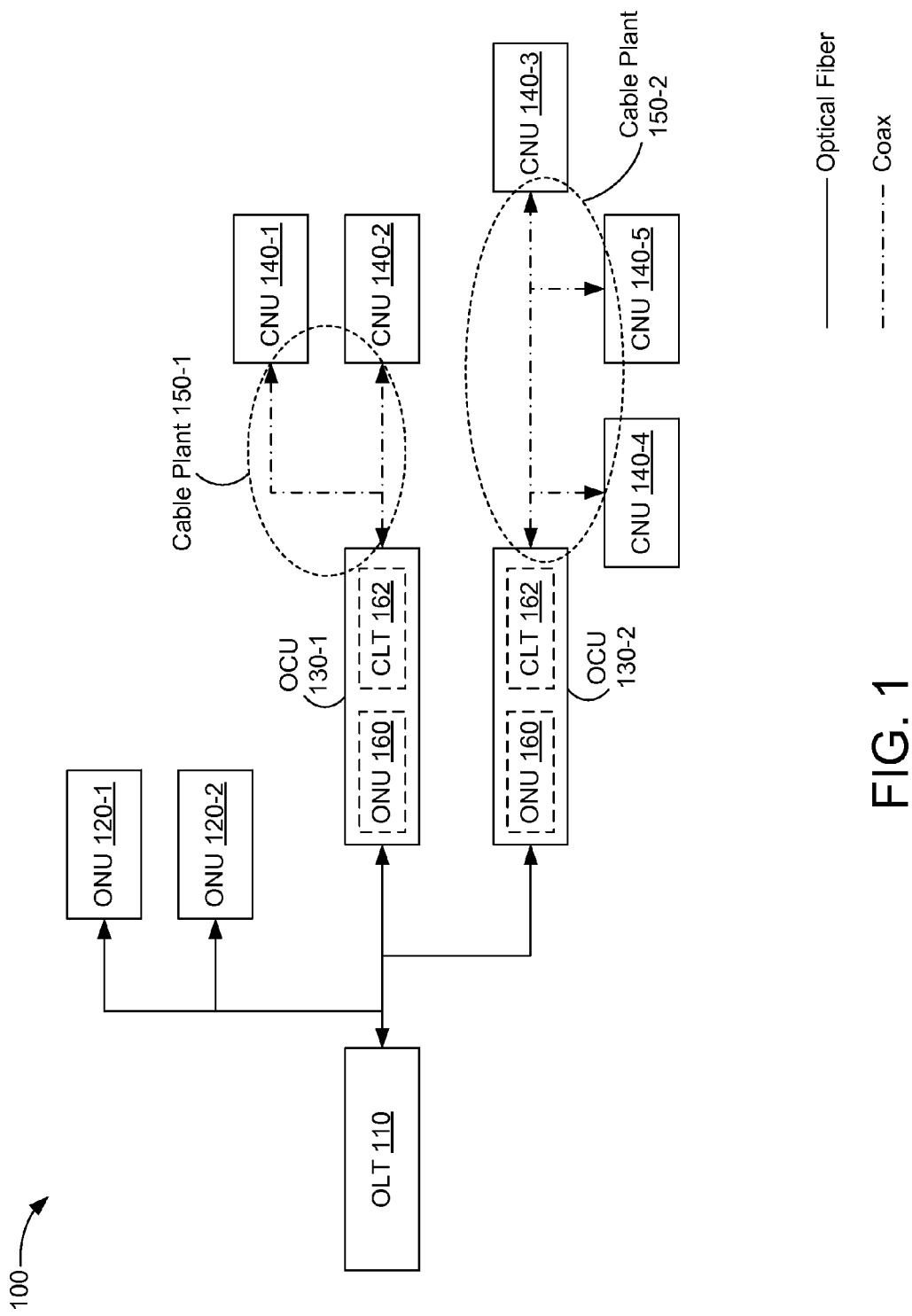
FIG. 1 is a block diagram of a network that includes both optical links and coax links in accordance with some embodiments.

Embodiments are disclosed in which the preamble used for communications (e.g., OFDM communications) over a coax medium varies depending on a mode of operation.

In some embodiments, an orthogonal frequency-division multiplexing (OFDM) coaxial physical layer device operates in at least two different modes: a discovery mode and a normal mode. In the discovery mode, a first coaxial signal is received that has a preamble including a plurality of first training fields and at least one second training field. Each first training field is shorter than each second training field. In the normal mode, a second coaxial signal is received that has a preamble including a single training field. The single training field is shorter than an OFDM symbol and shorter than each second training field.

In some embodiments, an orthogonal frequency-division multiplexing (OFDM) coaxial physical layer device includes a receiver and/or transmitter that are configurable to operate in a discovery mode and a normal mode. In the discovery mode, the receiver is configured to receive a coaxial signal having a preamble including a plurality of first training fields and at least one second training field. Each first training field is shorter than each second training field. Similarly, the transmitter is configured in the discovery mode to transmit a coaxial signal having a preamble including the plurality of first training fields and the at least one second training field. In the normal mode, the receiver is configured to receive coaxial signals having a preamble including a single training field. The single training field is shorter than an OFDM symbol and shorter than each second training field. Similarly, the transmitter is configured in the normal mode to transmit coaxial signals having a preamble including the single training field.

In the following description, numerous specific details are set forth such as examples of specific components, circuits, and processes to provide a thorough understanding of the present disclosure. Also, in the following description and for purposes of explanation, specific nomenclature is set forth to provide a thorough understanding of the present embodiments. However, it will be apparent to one skilled in the art that these specific details may not be required to practice the present embodiments. In other instances, well-known circuits and devices are shown in block diagram form to avoid obscuring the present disclosure. The term "coupled" as used herein means connected directly to or connected through one or more intervening components or circuits. Any of the signals provided over various buses described herein may be time-multiplexed with other signals and provided over one or more common buses. Additionally, the interconnection between circuit elements or software blocks may be shown as buses or as single signal lines. Each of the buses may alternatively be a single signal line, and each of the single signal lines may alternatively be buses, and a single line or bus might represent any one or more of a myriad of physical or logical mechanisms for communication between components. The present embodiments are not to be construed as limited to specific examples described herein but rather to include within their scopes all embodiments defined by the appended claims.

FIG. 1 is a block diagram of a network 100 that includes both optical links and coax links in accordance with some embodiments. The network 100 includes an optical line terminal (OLT) 110 (also referred to as an optical link terminal) coupled to a plurality of optical network units (ONUs) 120-1 and 120-2 via respective optical fiber links. The OLT 110 also is coupled to a plurality of optical-coax units (OCUs) 130-1 and 130-2 via respective optical fiber links. (OCUs are sometimes also referred to as media converters or coax media converters (CMCs)). The OCUs 130-1 and 130-2 receive optical signals from the OLT 110 and transmit corresponding electrical signals downstream to coax network units (CNUs) 140 via respective coax links. The OCUs 130-1 and 130-2 also receive upstream electrical signals from CNUs 140 via respective coax links and transmit corresponding optical signals to the OLT 110. The CNUs 140 transmit the upstream electrical signals at scheduled times specified by the corresponding OCU 130. The OCUs 130-1 and 130-2 thus act as relay stations. In the example of FIG. 1, a first OCU 130-1 communicates with CNUs 140-1 and 140-2, and a second OCU 130-2 communicates with ONUs 140-3, 140-4, and 140-5. The coax links coupling the first OCU 130-1 with CNUs 140-1 and 140-2 compose a first cable plant 150-1. The coax links coupling the second OCU 130-2 with CNUs 140-3 through 140-5 compose a second cable plant 150-2. A respective coax link may be a passive coax cable, or alternately may include one or more amplifiers and/or equalizers. In some embodiments, the OLT 110, ONUs 120-1 and 120-2, and optical portions of the OCUs 130-1 and 130-2 are implemented in accordance with the Ethernet Passive Optical Network (EPON) protocol.

In some embodiments, the OLT 110 is located at a network operator's headend, the ONUs 120 and CNUs 140 are located at the premises of respective users, and the OCUs 130 are located at the headend of their respective cable plants 150.

In some embodiments, each ONU 120 and OCU 130 in the network 100 receives data at the same data rate. The ONUs 120 and OCUs 130 each receive all of the packets transmitted by the OLT 110. For example, for unicast transmissions, each ONU 120 receives every packet transmitted by the OLT 110, but selects only the packets addressed to it, and discards all packets that are not addressed to it. Likewise, for unicast transmissions the OCUs 130 also receive every packet transmitted by the OLT 110, but filter out the packets not addressed to CNUs 140 in their respective cable plants 150.

In some embodiments, an OCU 130 includes an ONU 160 coupled back-to-back with a coax link terminal (CLT) 162. The ONU 160 receives downstream packet transmissions from the OLT 110 and provides them to the CLT 162. The CLT 162 filters out packets that are not addressed to CNUs 140 in its cable plant 150 and forwards the remaining packets to the CNUs 140 in its cable plant 150. The CLT 162 also receives upstream packet transmissions from CNUs 140 in its cable plant 150 and provides these to the ONU 160, which transmits them to the OLT 110. In some embodiments, the ONU 160 and CLT 162 are configured to allow for joint resource allocation between coax and optical links.

The coax PHYs of the OCUs 130 and CNUs 140 may be OFDM PHYs configurable to transmit and receive signals packets with preambles of varying lengths, depending on the mode of operation. For example, during a discovery mode in which CNUs 140 register with their corresponding OCU 130, a relatively long preamble is used that allows for accurate estimation of and compensation for signal impairments (e.g., carrier frequency offset between the OCU 130 and CNU 140). During a normal mode of operation, a shorter preamble is used that consumes less bandwidth.

Figure 2:
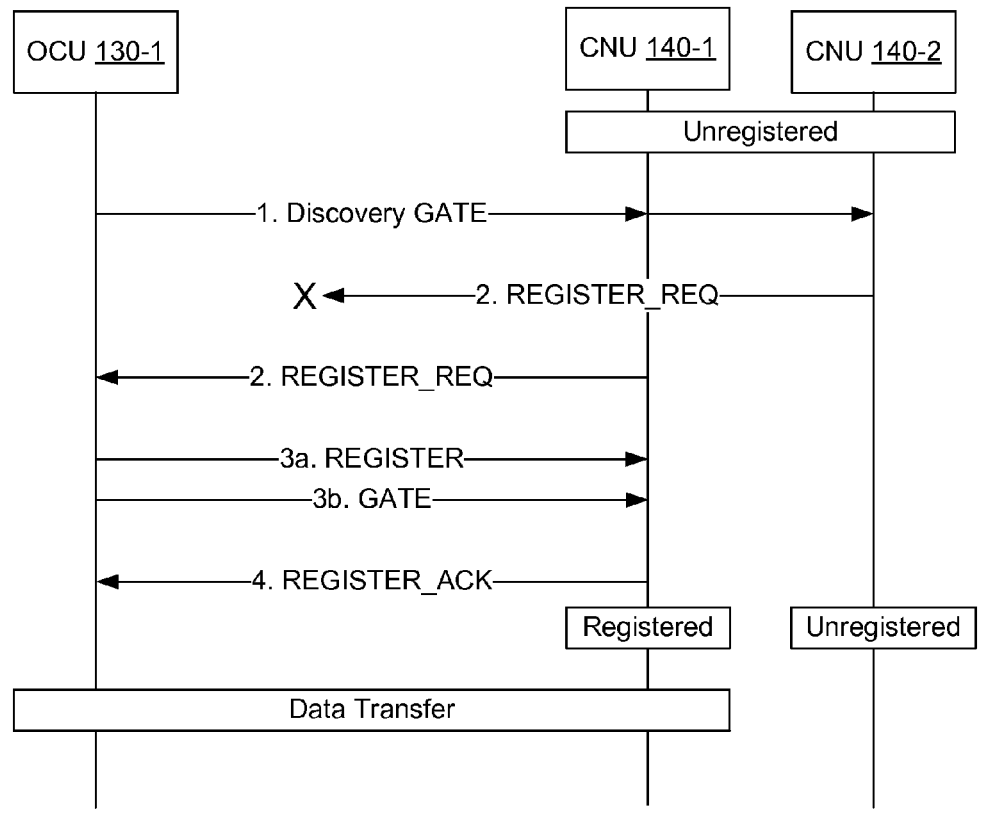
FIG. 2 illustrates an auto-discovery procedure performed during discovery mode, followed by data transfer during a normal mode of operation, in accordance with some embodiments.

FIG. 2 illustrates an auto-discovery procedure performed during discovery mode, followed by data transfer during a normal mode of operation, in accordance with some embodiments. The auto-discovery procedure is performed, for example, during a periodic discovery window when the CLT 162 (FIG. 1) exits normal operating mode and enters discovery mode. At the beginning of the auto-discovery procedure, CNU 140-1 and CNU 140-2 are both unregistered with the OCU 130-1, and thus are also unregistered with the OLT 110. The OCU 130-1 periodically distributes special GATE messages (e.g., discovery GATE) to trigger registration of unregistered CNUs 140. At step 1 of the procedure, the OCU 130-1 distributes one of these discovery GATE messages to the CNUs 140-1 and 140-2.

At step 2, unregistered CNUs 140-1 and 140-2 attempt to register, competing for upstream transmission by each replying with a REGISTER_REQ message. (The same message can also be issued by a CNU to unregister.) In the example of FIG. 2, the CNU 140-1 succeeds in transmitting its REGISTER_REQ message to the OCU 130-1, but the CNU 140-2 fails. The OCU 130-1 decodes the REGISTER_REQ message from the CNU 140-1 and replies to the CNU 140-1 with a REGISTER message for registration that assigns a unique logical link ID (LLID) to the CNU 140-1 (step 3a), and immediately sends a unicast GATE to the CNU 140-1 (step 3b). (The OCU 130-1 can also instruct the CNU 140-1 to unregister.) The CNU 140-1 replies with REGISTER_ACK (step 4) to complete registration (or with NACK if registration fails). At this point, the discovery mode ends; the CNU 140-1 is registered with the OCU 130-1, but the CNU 140-2 remains unregistered. After step 4, data transfer occurs between the OCU 130-1 and CNU 140-1 during a normal mode of operation.

In some embodiments, the downstream messages in steps 1, 3, and 5 originate from the OLT 110 and are forwarded to the CNUs 140-1 and 140-2 by the OCU 130-1. Also, in some embodiments the OCU 130-1 forwards the upstream messages in steps 2 and 4 to the OLT 110, to allow the CNUs 140-1 and 140-2 to register with the OLT 110 as well as with the OCU 130-1. In some embodiments, the messages in steps 1-4 are examples of multi-point control protocol (MPCP) messages.

Figure 3A:
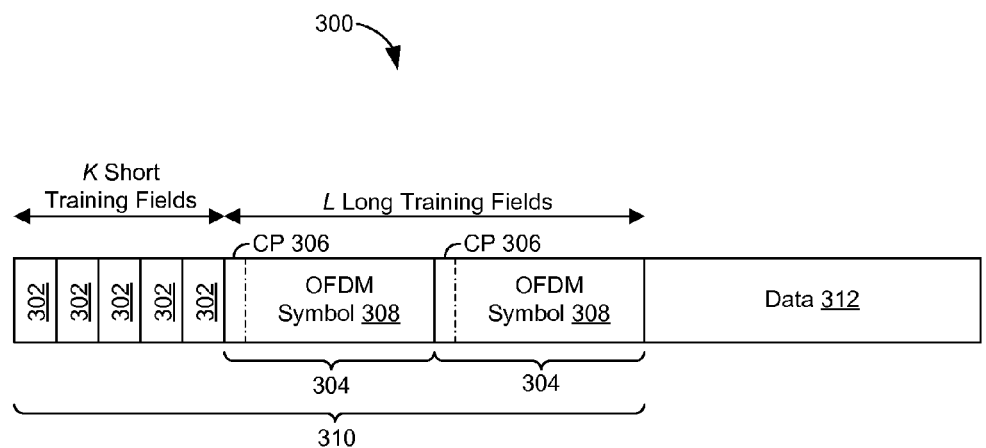
FIG. 3A is a data structure illustrating a packet with a long preamble in accordance with some embodiments.

FIG. 3A illustrates a packet 300 that includes a long preamble 310 in accordance with some embodiments. The long preamble 310 is used in the discovery mode, during a discovery period when a CNU 140 (FIG. 1) is registering with an OCU 130 (e.g., in accordance with the auto-discovery procedure of FIG. 2). For example, the long preamble 310 is used in one or more of the following multi-point control protocol (MPCP) messages: REGISTER_REQ, REGISTER, and REGISTER_ACK. In some embodiments, the long preamble 310 is also used on some idle signals during the normal mode of operation, to refresh the frequency offset estimate.

The initial frequency offset between a CLT 162 and a CNU 140 (FIG. 1) can potentially be quite high. For example, the CLT 162 and the CNU 140 may both use low-cost crystal oscillators, resulting in a significant frequency offset. To help compensate for this potentially high initial frequency offset, the long preamble 310 begins with K short training fields 302, where K is an integer greater than one. In one example, K=10, such that the long preamble 310 includes 10 short training fields 302. The short training fields 302 are used to make an initial estimate of frequency offset. In some embodiments, the K short training fields 302 are identical.

In some embodiments, a short training field 302 is constructed by creating an OFDM symbol in which only OFDM tones that are multiples of M are non-zero, where M is an integer greater than one, and all other tones in the symbol are set to zero. A specified fraction of tones is thus non-zero, with the specified fraction being equal to 1/M. In some examples, M is chosen so that the maximum potential frequency offset is less than one-half the spacing between non-zeros tones, which helps to ensure that the frequency offset estimate is not off by M tones. In one example, M=4: only tones that are multiples of 4 are non-zero. The OFDM symbol is then divided into M identical parts, each of which has a length of 1/M times the full OFDM symbol length (not counting the cyclic prefix of a full OFDM symbol). Each part forms a respective short training field 302. Each short training field 302 thus has a specified fraction of non-zero tones, where the specified fraction is 1/M, and has a duration of 1/M times the duration of a full OFDM symbol. In the example of M=4, the short training field 302 is one-fourth the length of an OFDM symbol (not counting the cyclic prefix). While this procedure results in M copies of the short training field 302, additional (or fewer) copies of the resulting short training field 302 may be included in the long preamble 310.

In some embodiments, a short training field 302 is constructed using an FFT whose size is 1/M times the size of the FFT used to create full OFDM symbols. This method is mathematically equivalent to using a full-sized FFT to create a full OFDM symbol with 1/M of the tones being non-zero and then dividing the full OFDM symbol into M identical parts, as described above, except that the smaller FFT produces only a single short training field 302 instead of M short training fields.

In some embodiments, the short training field 302 is constructed off-line and stored (e.g., in a memory 408, FIG. 4) before transmission.

After the short training fields 302, the long preamble 310 includes L long training fields 304, where L is an integer greater than or equal to one. In the example of FIG. 3A, the L long training fields 304 immediately follow the K short training fields 302, with no intervening time interval. In some embodiments, each long training field 304 is a full OFDM symbol 308 along with a cyclic prefix (CP) 306. The tones in the long training fields 304 are predefined so that they can be used for improved frequency offset estimation and channel estimation on each of the tones. In some embodiments in which L is greater than one (i.e., the packet 300 includes a plurality of long training fields 304), the L long training fields 304 are identical.

A data field 312 follows the long preamble 310 in the packet 300. The data field 312 includes one or more OFDM symbols. The data field 312 is sent using a known modulation and coding rate so there is no need to signal the rate in the long preamble 310. In some embodiments, the modulation is the lowest-order modulation available, so as to be able to work under the lowest signal-to-noise ratio (SNR) in a cable plant 150 (FIG. 1). In the discovery mode, the payload may include an indication of the message type and an identifier or address of the relevant CNU 140 (FIG. 1).

Though the short training fields 302 and long training fields 304 are described here in the frequency domain, they can be represented precisely in the time domain. Representing the short training fields 302 and long training fields 304 in the time domain allows for time and frequency offset estimation to be performed in the time domain. This estimation can be performed faster in the time domain than in the frequency domain, since FFT processing is not used if time and frequency offset estimation is done in the time domain.

In some embodiments, the carrier frequency and the bandwidth used to transmit the packet 300 can be specified at default values, which may differ from the normal mode's operating carrier frequency or bandwidth. This use of a default carrier frequency and bandwidth in the discovery mode makes installation and deployment of CNUs 140 on a cable plant 150 (FIG. 1) easier since the CNU 140 knows in advance the carrier frequency and signal bandwidth at which it will find the discovery control messages that use the long preamble 310. After registration during the discovery process (e.g., the process of FIG. 2), the CLT 162 (FIG. 1) can then transmit a signal to the CNU 140 specifying the carrier frequency and bandwidth to be used during normal operation. Alternatively, instead of having only a single default carrier frequency and bandwidth in the discovery mode, there may be several default carrier frequencies and bandwidth in the discovery mode. For example, the carrier frequency and bandwidth used to transmit the packet 300 are selected from a first group of carrier frequencies and bandwidths available in the discovery mode, and the carrier frequency and bandwidth used in the normal mode are selected from a second, larger group of carrier frequencies and bandwidths. In this way, the CNU 140 checks a few default cases (e.g. three cases of carrier frequencies and bandwidths), while there may be many (e.g. 20 or more) possible combinations of carrier frequency and bandwidth in the normal mode. The CNU 140 therefore only listens for the discovery messages on one or a few default carrier frequencies and bandwidths. This will significantly reduce the set-up time for a CNU 140.

Packets 300 with the long preamble 310 are used during the discovery mode described with respect to FIG. 2: since the CLT 162 and a CNU 140 have not yet exchanged any packets at the beginning of the discovery mode, there has been no opportunity to perform frequency offset estimation. Using packets 300 with the long preamble 310 allows an initial accurate frequency offset estimation to be performed. The long preamble 310 may also optionally be used on idle packets during normal operation. Thus if sufficient idle time is available during normal operation, a packet 300 with the long preamble 310 can be used to periodically improve the frequency offset estimation. A control signal (e.g., an idle request message) could be used to request an idle signal with a long preamble 310 if a packet 300 with a long preamble 310 has not been received for a specified period of time. The idle signal provided in response to the request is used to refresh the frequency offset estimate.

Figure 3B:
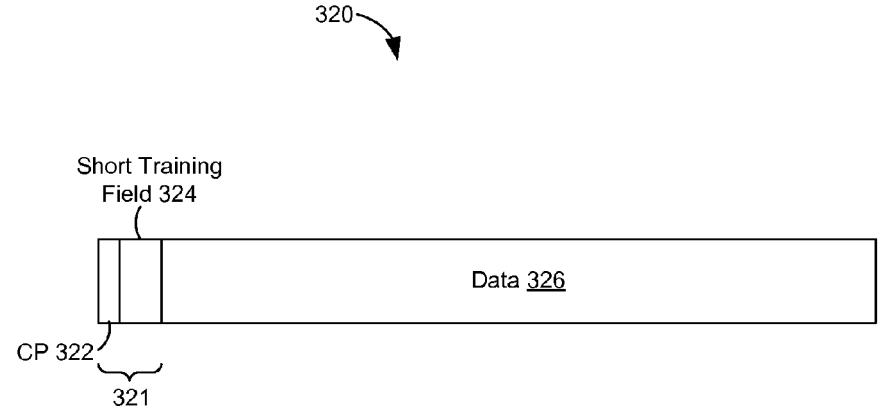
FIG. 3B is a data structure illustrating a packet with a short preamble in accordance with some embodiments.

A short preamble is used during normal operation after the CLT 162 and CNU 140 have previously exchanged packets 300 with long preambles 310 and performed frequency offset estimation using the long preambles 310. FIG. 3B illustrates a packet 320 with a short preamble 321 that includes a single short training field 324 in accordance with some embodiments.

The short preamble 321 is used during the normal mode of operation to avoid large overhead when sending data. The data field 326 of the packet 320 may include only a few OFDM symbols, or even a single OFDM symbol. Therefore, it is not practical for the short preamble 321 to include a full OFDM symbol; otherwise, its overhead would be excessive. Instead, the short preamble 321 of the packet 320 uses the single short training field 324 in accordance with some embodiments. In some embodiments, only tones in the short training field 324 that are multiples of N are non-zero tones, where N is an integer greater than one. All the other tones are set to zero. The value of N may or may not be equal to the value of M used for the short training fields 302 (FIG. 3A). In one example, N equals 16. The preamble 321 also includes a cyclic prefix 322 (e.g., to address multi-path delay spread). In some embodiments, an OFDM symbol uses a 4096 FFT and thus has 4096 tones; therefore, if N=16 there are at most 256 non-zero tones in the short training field 324. Some (e.g., a majority) of these non-zero tones may be set to predefined values, but a subset of these non-zero tones may be modulated to provide information about the data field 326, including for example what modulation is used in the data field 326. In some embodiments, the modulation used for this subset of non-zero tones in the short training field 324 is the lowest-order modulation available.

In some examples, there are 256 non-zero tones in the short training field 324, of which one-fourth are modulated for data transmission, resulting in 64 tones used to transmit data. If a low-order modulation (e.g., 16-QAM) is used, then 256 bits of data can be sent using the short training field 324. These 256 bits are equivalent to 32 bytes of information, which is more than sufficient to communicate the modulation order and other information about the data field 326. The remaining 256−64=192 tones of the short training field 324 are encoded with predefined values, which can be used to identify the start of the packet 320 and to update the frequency offset estimate.

The short preamble 321 can be used in the normal mode of operation since in the downstream direction the only packets received by a CNU 140 are transmitted from the CLT 162 (FIG. 1), and the CNU 140 has already used the long preamble 310 (FIG. 3A) during the discovery mode to calculate its frequency offset with respect to the CLT 162. In the upstream direction, the CLT 162 (FIG. 1) knows in advance which CNU 140 is transmitting in any given time window, since the CLT 162 has scheduled the time windows and thus assigned the time windows to respective CNUs 140. The CLT 162 has already calculated its frequency offsets for respective CNUs 140, using long preambles 310 transmitted from the respective CNUs 140 to the CLT 162 (e.g., during discovery mode and/or as part of idle symbols). The CLT 162 uses the calculated frequency offsets to receive packets from the CNUs 140 during the normal mode of operation.

Figure 4:
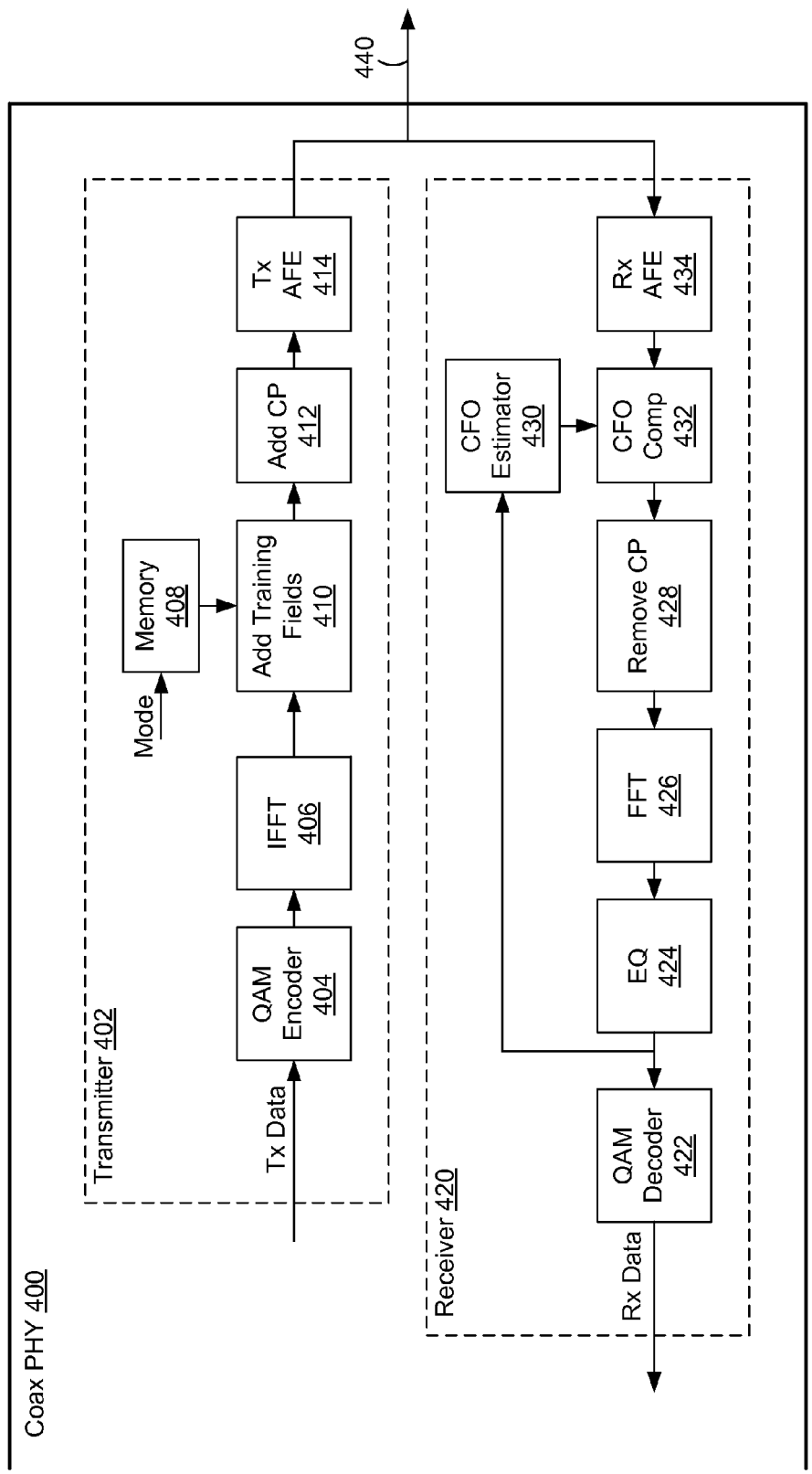
FIG. 4 is a block diagram of an OFDM coax physical layer device in accordance with some embodiments.

FIG. 4 is a block diagram of an OFDM coax physical layer device 400 in accordance with some embodiments. The PHY 400 is configurable to transmit and/or receive both packets 300 with long preambles 310 (FIG. 3A) and packets 320 with short preambles 321 (FIG. 3B). A transmitter 402 transmits packets 300 and 320, and a receiver 420 receives packets 300 and 320. In the transmitter 402, data to be transmitted is provided to a quadrature amplitude modulation (QAM) encoder 404, which encodes the data by performing symbol mapping and provides the resulting symbols to an inverse fast Fourier transform (IFFT) block 406 that transforms the symbols into a time-domain sequence that corresponds, for example, to the data field 312 (FIG. 3A) or 326 (FIG. 3B).

The output of the IFFT 406 is provided to a functional block 410 that adds the appropriate training field or fields (e.g., short training fields 302 and the OFDM symbols 308 of long training fields 304, FIG. 3A, or the short training field 324, FIG. 3B). In some embodiments, the training fields are calculated off-line and stored in a memory 408, which provides the appropriate training field(s) to the block 410 in response to a mode signal. When the mode signal is in a first state (e.g., corresponding to the discovery mode, or in response to a request for an idle symbol), the memory 408 provides the training fields of the long preamble 310 (FIG. 3A) (but minus the cyclic prefixes 306, in accordance with some embodiments) to the block 410, which prepends them to the output of the IFFT 406. When the mode signal is in a second state (e.g., corresponding to the normal operating mode, or the normal operating mode in the absence of a request for an idle symbol), the memory 408 provides the short training field 324 of the short preamble 321 (FIG. 3B) to the block 410, which prepends it to the output of the IFFT 406. A functional block 412 adds cyclic prefixes (e.g., cyclic prefixes 306, FIG. 3A, or 322, FIG. 3B) and provides the resulting packets to a transmitter analog front end (AFE) 414, which transmits the packets using a selected carrier frequency and bandwidth.

In the receiver 420, an analog front-end (AFE) 434 receives signals on a selected carrier frequency and bandwidth, down-converts the received signals to baseband, and digitizes the down-converted signals. A carrier frequency offset (CFO) compensation block 432 compensates for carrier frequency offset (e.g., by performing signal rotation). The CFO compensation block 432 compensates for an amount of CFO as estimated by a CFO estimator 430. In some embodiments, the CFO estimator 430 estimates the CFO using non-linear least squares estimation based on the received training fields.

A cyclic prefix removal block 428 coupled to the CFO compensation block 432 removes the cyclic prefixes (e.g., cyclic prefixes 306, FIG. 3A, or 322, FIG. 3B). The CP removal block 428 is coupled to a fast Fourier transform (FFT) block 426, the output of which is coupled to an equalizer (EQ) 424. The output of the equalizer 424 is provided to a QAM decoder 422, which outputs the received data, and is also fed back to the CFO estimator 430. The CFO estimator makes an initial CFO estimate using the short training fields 302 and refines this estimate using the long training fields 304 (FIG. 3A). (Alternatively, the input to the CFO estimator 430 is taken from before the FFT 426 and CFO is estimated in the time domain.) This CFO estimate is then used to receive data during the normal mode of operation.

Figure 5:
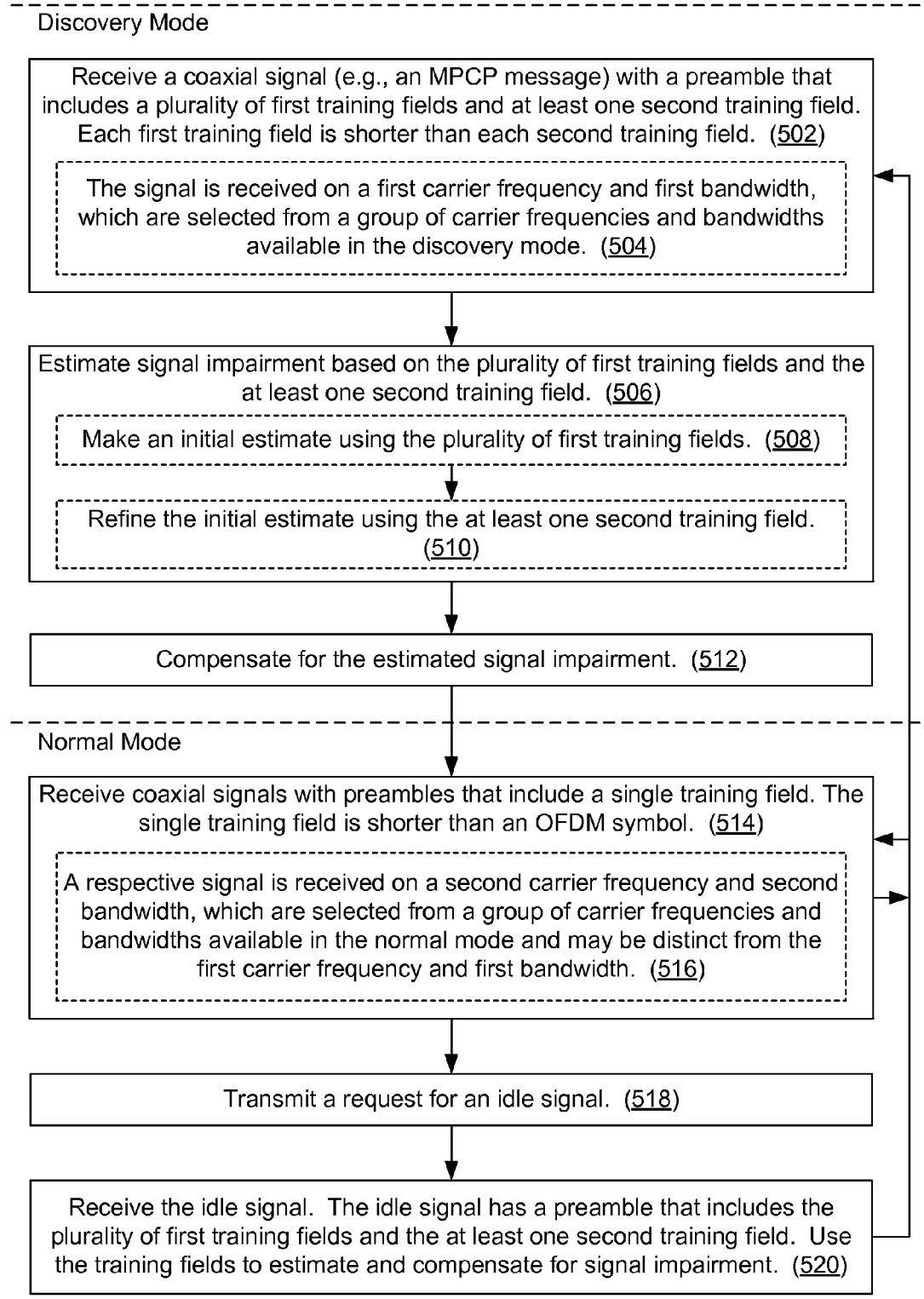
FIG. 5 is a flow chart illustrating a method of operating an OFDM coax PHY in accordance with some embodiments.

FIG. 5 is a flow chart illustrating a method 500 of operating an OFDM coax PHY (e.g., coax PHY 400, FIG. 4) in accordance with some embodiments. In some embodiments, the OFDM coax PHY is part of a CNU (e.g., one of the CNUs 140-1 through 140-5, FIG. 1). Alternately, the OFDM coax PHY is part of an OCU (e.g., part of a CLT 162 in the OCU 130-1 or 130-2, FIG. 1).

During discovery mode (e.g., during the auto-negotiation procedure of FIG. 2), a coaxial signal (e.g., an MPCP message, such as REGISTER_REQ, REGISTER, and REGISTER_ACK) is received (502) with a preamble (e.g., long preamble 310, FIG. 3A) that includes a plurality of first training fields (e.g., short training fields 302, FIG. 3A) and at least one second training field (e.g., at least one long training field 304, FIG. 3A). Each first training field is shorter than each second training field. In some embodiments, the signal is received (504) on a first carrier frequency and first bandwidth, which are selected from a group of carrier frequencies and bandwidths available in the discovery mode.

An estimate of signal impairment (e.g., carrier frequency offset) is made (506) based on the plurality of first training fields and the at least one second training field. An initial estimate is made (508) using the plurality of first training fields, and the initial estimate is refined (510) using the at least one second training field. Compensation for the estimated signal impairment is performed (512). For example, the CFO estimation block 430 (FIG. 4) makes and refines an estimate of carrier frequency offset and the CFO compensation block 432 (FIG. 4) compensates for the estimated carrier frequency offset.

During the normal mode of operation, coaxial signals are received (514) with preambles (e.g., short preambles 321, FIG. 3B) that include a single training field (e.g., short training field 324, FIG. 3B). The single training field is shorter than an OFDM symbol and shorter than the second training field used in the discovery mode. In some embodiments, a respective signal is received (516) on a second carrier frequency and second bandwidth, which are selected from a group of carrier frequencies and bandwidths available in the normal mode and may be distinct from the first carrier frequency and first bandwidth. The group of carrier frequencies and bandwidths available in the normal mode may be larger than the group of carrier frequencies and bandwidths available in the discovery mode (e.g., may be a superset of the carrier frequencies and bandwidths available in the discovery mode).

In some embodiments, a request for an idle signal (or more generally, a control signal) is transmitted (518) during the normal mode. The requested idle signal is received (520). The idle signal has a preamble (e.g., a long preamble 310, FIG. 3A) that includes the plurality of first training fields (e.g., short training fields 302, FIG. 3A) and the at least one second training field (e.g., at least one long training field 304, FIG. 3A). The training fields of the idle signal are used (520) to estimate and compensate for signal impairment. For example, the training fields of the idle signal are used to update an estimate of carrier frequency offset (e.g., as performed by CFO estimation block 430, FIG. 4), which is then compensated for (e.g., by CFO compensation block 432, FIG. 4).

In some embodiments, a request for an idle signal (or more generally, a control signal) is received during the normal mode. In response, the requested idle signal is transmitted with a preamble (e.g., a long preamble 310, FIG. 3A) that includes the plurality of first training fields (e.g., short training fields 302, FIG. 3A) and the at least one second training field (e.g., at least one long training field 304, FIG. 3A).

In some embodiments in which the method 500 is performed in a CNU (e.g., one of the CNUs 140-1 through 140-5, FIG. 1), the received signals are transmitted by an OCU (e.g., by a CLT 162 in the OCU 130-1 or 130-2, FIG. 1). In some embodiments in which the method 500 is performed in an OCU (e.g., the OCU 130-1 or 130-2, FIG. 1), the received signals are transmitted by a CNU (e.g., one of the CNUs 140-1 through 140-5, FIG. 1). Furthermore, the device performing the method 500 may also transmit a coaxial signal that includes the plurality of first training fields and at least one second training field during the discovery mode, and transmit coaxial signals with preambles that include the single training field during the normal mode.

While the method 500 includes a number of operations that appear to occur in a specific order, it should be apparent that the method 500 can include more or fewer operations, which can be executed serially or in parallel. An order of two or more operations may be changed and two or more operations may be combined into a single operation.

In the foregoing specification, the present embodiments have been described with reference to specific exemplary embodiments thereof. It will, however, be evident that various modifications and changes may be made thereto without departing from the broader spirit and scope of the disclosure as set forth in the appended claims. The specification and drawings are, accordingly, to be regarded in an illustrative sense rather than a restrictive sense.

What is claimed is:

1. A method of operating a coaxial physical layer device, the method comprising:
   in a discovery mode, receiving a first orthogonal frequency-division multiplexing (OFDM) coaxial signal having a preamble including a plurality of first training fields and at least one second training field, wherein each first training field is shorter than each second training field; and
   in a normal mode, receiving a second OFDM coaxial signal having a preamble including a single training field, wherein the single training field is shorter than an OFDM symbol.

2. The method of claim 1, wherein each first training field is a predefined fraction of an OFDM symbol and each second training field comprises an OFDM symbol.

3. The method of claim 1, wherein a first predefined fraction of tones in each first training field is non-zero and a second predefined fraction of tones in the single training field is non-zero.

4. The method of claim 3, wherein:
   the second coaxial signal includes a data field after the preamble; and
   tones in the second predefined fraction of tones in the single training field include a first group of tones set to predefined values and a second group of tones that are modulated to provide information about the data field.

5. The method of claim 1, wherein:
   in the discovery mode, each first training field has a duration of 1/M times a duration of an OFDM symbol; and
   1/M of the tones in each first training field are non-zero;
   wherein M is an integer greater than one.

6. The method of claim 5, wherein, in the normal mode, 1/N of the tones in the single training field are non-zero, wherein N is an integer greater than one.

7. The method of claim 1, wherein the first coaxial signal comprises a multi-point control protocol message.

8. The method of claim 7, wherein the multi-point control protocol message is selected from the group consisting of REGISTER_REQ, REGISTER, and REGISTER_ACK.

9. The method of claim 1, wherein the second coaxial signal includes a cyclic prefix prior to the single training field.

10. The method of claim 1, wherein the first coaxial signal is received on a first carrier frequency and first bandwidth, and the second coaxial signal is received on a second carrier frequency and second bandwidth that are distinct from the first carrier frequency and first bandwidth.

11. The method of claim 10, wherein:
   the first carrier frequency and first bandwidth are selected from a first group of carrier frequencies and bandwidths available during the discovery mode; and
   the second carrier frequency and second bandwidth are selected from a second group of carrier frequencies and bandwidths available during the normal mode, wherein the second group is larger than the first group.

12. The method of claim 1, further comprising:
   in the normal mode, transmitting a request for an idle signal; and
   in response to the request, receiving the idle signal, wherein the idle signal has a preamble including the plurality of first training fields and the at least one second training field.

13. The method of claim 1, further comprising:
   in the discovery mode, transmitting a third coaxial signal having a preamble including the plurality of first training fields and the at least one second training field; and
   in the normal mode, transmitting a fourth coaxial signal having a preamble including the single training field.

14. The method of claim 13, further comprising:
in the normal mode, receiving a request for an idle signal; and
in response to the request, transmitting the idle signal, wherein the idle signal has a preamble including the plurality of first training fields and the at least one second training field.

15. The method of claim 1, further comprising:
estimating signal impairment based on the plurality of first training fields and the at least one second training field; and
compensating for the estimated signal impairment.

16. The method of claim 15, wherein estimating the signal impairment comprises:
making an initial estimate using the plurality of first training fields; and
refining the initial estimate using the at least one second training field.

17. The method of claim 1, wherein the coaxial physical layer device is situated in a coax network unit coupled to a coax line terminal by a cable plant.

18. The method of claim 1, wherein the coaxial physical layer device is situated in a coax line terminal coupled to a coax network unit by a cable plant.

19. A coaxial physical layer device, comprising a receiver configurable to operate in a discovery mode and a normal mode, wherein:
in the discovery mode, the receiver is configured to receive an orthogonal frequency-division multiplexing (OFDM) coaxial signal having a preamble including a plurality of first training fields and at least one second training field, wherein each first training field is shorter than each second training field; and
in the normal mode, the receiver is configured to receive OFDM coaxial signals having a preamble including a single training field, wherein the single training field is shorter than an OFDM symbol.

20. The coaxial physical layer device of claim 19, wherein:
in the discovery mode, each first training field has a duration of 1/M times a duration of an OFDM symbol; and
1/M of the tones is each first training field are non-zero;
wherein M is an integer greater than one.

21. The coaxial physical layer device of claim 19, further comprising a transmitter configurable to operate in the discovery mode and the normal mode, wherein:
in the discovery mode, the transmitter is configured to transmit a coaxial signal having a preamble including the plurality of first training fields and the at least one second training field; and
in the normal mode, the transmitter is configured to transmit coaxial signals having a preamble including the single training field.

22. The coaxial physical layer device of claim 19, further comprising:
a frequency offset estimator to make an initial frequency offset estimate using the plurality of first training fields and to make a refined frequency offset estimate using the at least one training field; and
a frequency offset compensator to compensate for the refined frequency offset estimate.

23. A method of operating a coaxial physical layer device, the method comprising:
transmitting and receiving coaxial signals having preambles that include a single training field, wherein the single training field is shorter than an orthogonal frequency-division multiplexing (OFDM) symbol;
receiving a control signal; and
in response to the control signal, transmitting an OFDM coaxial signal having a preamble including a plurality of first training fields and at least one second training field, wherein each first training field is shorter than each second training field.

24. The method of claim 23, wherein the control signal comprises an idle signal.

* * * * *